(12) United States Patent
Kamp et al.

(10) Patent No.: US 10,126,764 B2
(45) Date of Patent: Nov. 13, 2018

(54) POWER CONVERTER AND MANAGEMENT SYSTEM FOR PROVIDING ENERGY TO A PULSATING LOAD

(71) Applicants: Petrus Kamp, Sluiskeshoeven (NL); Lambertus Franciscus Maria De Koning, Wijchen (NL)

(72) Inventors: Petrus Kamp, Sluiskeshoeven (NL); Lambertus Franciscus Maria De Koning, Wijchen (NL)

( * ) Notice: Subject to any disclaimer, the term of this patent is extended or adjusted under 35 U.S.C. 154(b) by 1 day.

(21) Appl. No.: 15/550,848

(22) PCT Filed: Feb. 16, 2016

(86) PCT No.: PCT/NL2016/050107
§ 371 (c)(1),
(2) Date: Aug. 14, 2017

(87) PCT Pub. No.: WO2016/133383
PCT Pub. Date: Aug. 25, 2016

(65) Prior Publication Data
US 2018/0024579 A1    Jan. 25, 2018

Related U.S. Application Data

(60) Provisional application No. 62/116,936, filed on Feb. 17, 2015.

(51) Int. Cl.
*G05F 1/46* (2006.01)
*H02H 7/12* (2006.01)
*H02H 9/02* (2006.01)

(52) U.S. Cl.
CPC ............. *G05F 1/46* (2013.01); *H02H 7/1213* (2013.01); *H02H 9/02* (2013.01)

(58) Field of Classification Search
CPC ................................................... H02M 3/1582
(Continued)

(56) References Cited

U.S. PATENT DOCUMENTS 4,549,254 A * 10/1985 Kissel ..................... F02P 15/12
                                                            323/222
5,710,699 A *  1/1998 King ..................... B60L 11/005
                                                            318/139

(Continued)

FOREIGN PATENT DOCUMENTS

WO          97/31423        8/1997

OTHER PUBLICATIONS

International Search Report and Written Opinion of International Application No. PCT/NL2016/050107; 8 pages; dated May 31, 2016.

*Primary Examiner* — Jeffrey Sterrett
(74) *Attorney, Agent, or Firm* — Shumaker, Loop & Kendrick, LLP

(57) ABSTRACT

An energy storage (ES) circuit including a plurality of terminals configured to connect to a pulse load having an input voltage and drawing a low current during a first interval and a high current during a second interval, and connect to a power supply having a source voltage and delivering a source current, an energy storage capacitor connected to the plurality of terminals, and a bidirectional direct current (DC) to DC converter configured to recharge, during at least a portion of the first interval, the energy storage capacitor using a plurality of charge drawn from the source current, and reduce a drop in the input voltage during the second interval by delivering a difference between the source current and the high current to the pulse load using the plurality of charge stored in the energy storage capacitor.

3 Claims, 2 Drawing Sheets

(58) Field of Classification Search
USPC .......................................... 323/222, 271, 282
See application file for complete search history.

(56) References Cited

U.S. PATENT DOCUMENTS

| | | | |
|---|---|---|---|
| 6,087,811 A | 7/2000 | Crawford et al. | |
| 2012/0049819 A1* | 3/2012 | Mao .................... | H02M 3/1582 |
| | | | 323/282 |
| 2012/0068537 A1* | 3/2012 | Hintz .................... | B60L 11/005 |
| | | | 307/43 |
| 2014/0266073 A1 | 9/2014 | Keller | |
| 2015/0367735 A1* | 12/2015 | Baker .................... | B60L 11/02 |
| | | | 307/10.1 |
| 2018/0024579 A1* | 1/2018 | Kamp ...................... | G05F 1/46 |

* cited by examiner

POWER CONVERTER AND MANAGEMENT SYSTEM FOR PROVIDING ENERGY TO A PULSATING LOAD

TECHNICAL FIELD AND BACKGROUND

The present invention is related to a power converter and management system for providing energy to a pulsating load.

Batteries in general and small Lithium primary batteries in particular have limitations with respect to the amount of current that can be supplied to a connected load. The current is especially limited by the internal resistance of the battery as the voltage drop across the internal resistance reduces the battery voltage significantly.

Another effect is the deterioration of the battery capacity when loaded with high current pulses. In many electronic systems (low duty cycle systems) short pulses of high current have to be delivered by the battery. In such cases it is common practice to overcome the high internal resistance of the battery by connecting a shunt capacitor in parallel to the battery or using a dedicated storage capacitor. A disadvantage is the internal leakage current of the capacitor, that will add to the supply current. Especially when electrolytic capacitors are used, this leakage can be significant. It reduces the lifetime of the battery and thus the electronic system supplied by the battery.

Examples of such systems are Wireless Communications systems based on the IEEE 802.15.4 (Zigbee) standard. These are characterized by very low duty cycles of operation which means that long periods of inactivity are followed by a short active time period in which radio communication takes place, requiring a short pulse of high supply current.

A way to overcome some of the problems associated with supplying pulsating loads is to buffer energy from the battery in an energy storage capacitor. A known system uses voltage conversion techniques to charge and discharge a buffer capacitor. However such a system cannot be used in low power consumption applications which cannot tolerate the internal and external leakage current associated with the buffer capacitor. Further the high tolerance and temperature coefficient of practical capacitors reduce the efficiency of the energy transfer of the system which negatively impacts the battery lifetime.

BRIEF SUMMARY

It is the objective of the present invention to provide for a power converter and management system in which the lifespan of a battery power source, which is providing energy for pulsating loads, is increased.

The objective is achieved, in a first aspect, by a power converter and management system for providing energy to a pulsating load, comprising:
  up-converting means for converting a power source voltage to a higher voltage on a storage capacitor, thereby storing energy in said storage capacitor for providing energy to a single pulse load of said pulsating load;
  limiting means for limiting a current drawn by said up-converting means, from said primary power source voltage, to a maximum current setting;
  down-converting means for converting said storage capacitor voltage to a lower operating voltage, which lower operating voltage is provided to said single pulse load of said pulsating load thereby consuming energy stored in said storage capacitor and thereby leaving an inevitable residual storage voltage at, i.e. leaving inevitable residual charge in, at said storage capacitor;
  energy optimizer means comprising:
    voltage measuring means arranged for measuring said residual storage voltage at, i.e. residual charge in, said storage capacitor, i.e. after energy in said storage capacitor has been consumed by said single pulse load of said pulsating load;
    comparing means arranged for comparing said measured residual storage voltage, i.e. residual charge, with a predefined target voltage thereby defining a delta voltage;
    control means arranged for controlling said up-converting means such that the amount of energy to be stored in said storage capacitor is controlled in such a way that said delta voltage is lowered for a subsequent pulse of said pulsating load.

It was the insight of the inventors that the lifespan of a battery power source dramatically decreases in case situations occur in which excess currents are drawn from the battery power source. This is typically the case for pulsating loads, which have the intrinsic property of only dissipating a large amount of energy in a short period of time. During this short time, the current drawn from the primary battery source voltage may excess a certain threshold, i.e. a maximum current setting, which is disadvantageous for the life span of the battery power source.

As such, the inventors found a way to limit the current drawn from the battery power source, i.e. by incorporating an intermediate storage capacitor for storing electrical energy, which electrical energy may be dissipated by the pulsating load during the above-mentioned short period of time, i.e. during a single pulse of the pulsating load that is defined as the "ON"-period. During the "OFF"-period of the pulsating load, the storage capacitor may be charged again by the up-converting means, which charging is coupled to the limiting means for limiting the charging current to the capacitor to a maximum current setting.

It was the further insight of the inventors that the leakage current of the storage capacitor is one of the main reasons of the relative low life span of a battery. This leakage current is simply lost.

In order to limit the leakage current of the storage capacitor, the inventors found that it may be advantageous if the total energy left in the storage capacitor after the "ON"-period for pulsating loads is minimized, or at least controlled to a minimum level. To do so, a parameter related to the residual energy in the storage capacitor, for example the residual voltage at the capacitor, is measured by measuring means. The parameter is compared, using the comparing means, with a predefined target parameter value thereby defining a delta parameter value. The up-converting means are controlled using the delta parameter value.

The electrical energy the storage capacitor needs to store each pulsating cycle can be determined rather accurately, as the energy required for each of the pulsating loads can be estimated in advance. As such, the power converter and management system according to the present invention comprises means for measuring a parameter related to the amount of energy left in the storage capacitor, and for controlling the total amount of electrical energy to be charged to the storage capacitor based on the parameter (i.e. residual electrical energy) and on a predetermined target voltage/electrical energy setting (i.e. related to the estimated electrical energy required during the next "ON"-cycle.)

Based on the above a highly efficient power management electronic system with built-in energy optimizer is obtained that enables small batteries to supply high peak currents to a connected load with a substantially constant voltage, not limited by the internal resistance or maximum current supply capability of the battery.

In a second aspect of the invention, there is provided a Complementary Metal Oxide Semiconductor, CMOS, integrated circuit, IC, comprising a power converter and management system according to any of the previous claims.

The IC may comprise other functions as well as the power converter and management system. The IC may also be provided as a stand alone unit comprising substantially only the power converter and management system according to the present invention.

In an embodiment of the invention, the new system exists of a number of basic functional blocks. A voltage converter ("Converter") with 2 modes of operation: voltage up conversion ("Boost conversion") and voltage down conversion ("Buck conversion"), an energy Storage capacitor ("Capacitor"), an energy optimizer, i.e. energy optimizer means, ("Optimizer") a start-up circuit ("Start-up") and a digital control interface ("Interface"). For the sake of simplicity the Interface is described here as a basic three wire logic control unit. However in practice it can support different levels of programmability and support various communication protocols.

DETAILED DESCRIPTION

Figure 1:
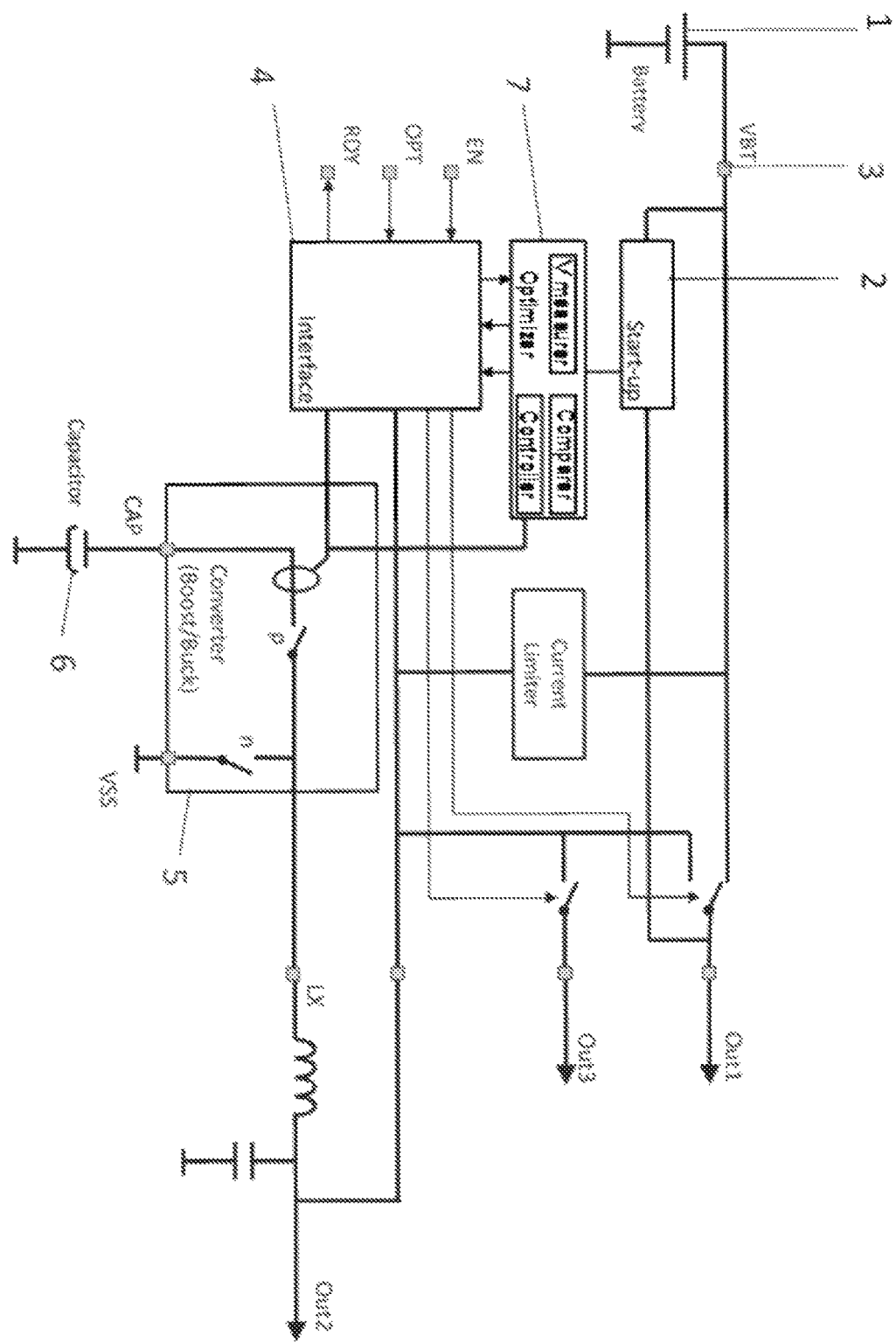
FIG. 1 is a system diagram depicting a power converter and management system according to an embodiment of the invention.

The blocks are shown in the system diagram of FIG. 1. The system is defined in such a way that it can be implemented as a CMOS Integrated Circuit.

The system is activated by connecting the battery. Then the Start-up circuit 2 connects the VBT input 3 to one or more outputs. Now the system is in standby mode and the Start-up circuit 2 is not consuming any substantial current anymore. The connection to Out1 is always enabled during start-up and in standby mode. The digital enable signal (EN) at the Interface 4 can bring the system from standby in active mode and will start a two-phase cycle of operation. First the Converter 5 becomes active in Boost mode (also named "Boost phase") and charges the storage capacitor 6 until a set maximum voltage Vmax is reached. The current taken by the Converter 5 from the battery 1 during the Boost phase is a substantially constant current as it is limited by the limiting means which are, for example, implemented in the optimizer 7 or the interface 4. Secondly, the Converter 5 switches to Buck conversion and the "Buck phase" (also named "Buck mode") starts.

A digital signal (RDY) at the Interface indicates this. In Buck phase the converter has a controlled substantially constant output voltage and is able to deliver a pulse of current to the connected load (at Out1 and/or Out2 and/or Out3) which can be substantially higher than the current delivered by the battery to the converter 5 in the Boost phase. During Buck phase, no current is supplied by the battery 1 to the outputs (Out1, Out2 and Out3). The Optimizer controls the value of Vmax (see "Energy Optimizer").

Figure 2:
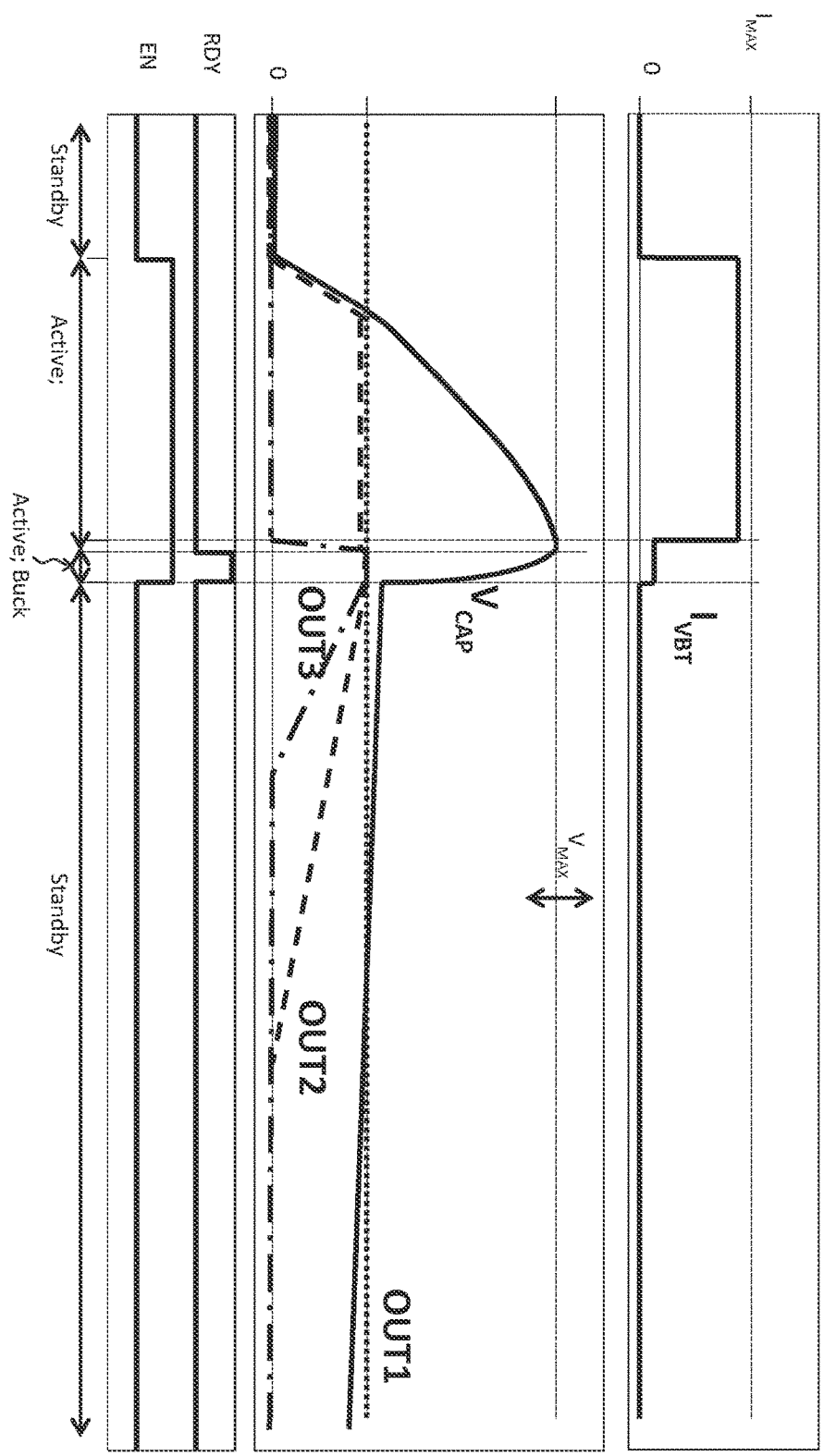
FIG. 2 is a graph depicting system operation.

To illustrate the system operation FIG. 2 shows the relative timing relations between the logic signals, the output signals, the voltage at the capacitor and the current supplied from the battery. The waveforms shown in FIG. 2 are not exact but examples to help visualizing the system operation.

When a battery 1 is connected to the system, the start-up circuit will be activated. The start-up circuit will supply output "Out1" only, with a limited maximum current. As soon as Out1 has reached the minimum operating voltage, the start-up circuit will force the system in standby mode. In standby mode:

The power management system uses no supply current, Out1 is connected to input VBT where the battery is connected.

In Boost mode the Converter 5 transfers electrical power, i.e. electrical energy, from the Battery 1 to the storage capacitor 6. A property of the Converter 5 in the Boost phase is that the current taken from the battery is a substantially constant current, due to the limiting means, and consequently the storage capacitor 5 is charged with a varying current. This substantially constant load current is beneficial because the current from the battery must be limited to a safe value, while it should be maximized at the same time to charge the storage capacitor 6 fast enough. The value of the current can be set via the Interface 4 to a programmable fixed value.

The load current can for example be controlled by measuring the duration of the conversion time and adapting the conversion frequency accordingly, such that the average current delivered by the battery is substantially constant. The conversion time is the time it takes for the Converter 5 to accumulate energy in the inductor and transfer this energy to the storage capacitor 6.

In Buck mode the Converter 5 is connected between the storage capacitor 6 and the supply outputs of the system (Out1, Out2 and Out3). The number of outputs is not limited but can be any number of outputs. Electronic switches controlled by the Interface can be used to enable these multiple independent supply outputs. In Buck mode the output voltage of the system is substantially constant. The converter has a control system to keep the output voltage constant (to a fixed value or a value programmed via the Interface) for varying load conditions. The RDY signal will change its logic value when the voltage across the storage capacitor 6 is lower than a set value to indicate the nearing low supply condition. The converter will remain to operate and stops just when the enable input EN has changed its logic value.

After each charge and discharge cycle residual energy is left in the storage capacitor 6 when the system returns to standby mode. In practice this residual energy will leak away if the duration of the standby mode is long enough. The amount of residual energy depends on the initial energy stored in the storage capacitor 5 ($\frac{1}{2} CV^2$) and the energy used ("energy packet") during the Buck phase. There are two observations to be made:

The stored energy depends on the value of the storage capacitor 5 and the voltage across the storage capacitor 5. Tolerances of these parameters are typically to be taken into account during system design to guarantee the minimum available amount of energy that can be delivered. In practical cases the fabrication tolerance and temperature coefficient require considerable over sizing of the value of the capacitor.

Theoretically the size of the energy packets is constant to a large degree or there is a limited number of discretely varying energy packets involved in many low duty cycle systems. However, the size of the energy packets will vary due to environmental factors like temperature and component aging. This means that in well-engineered systems the amount of initial stored energy has to be higher or equal than the maximum energy packet size anticipated during the life time of the system.

Because of these two factors, the storage capacitor is typically sized for the worst case conditions at the design of the system and will be much larger than needed for most conditions. As a consequence, the residual energy left in the capacitor at the end of the active cycle is considerable.

The Optimizer 7, i.e. the energy optimizer means 7, is the solution to this problem. The Optimizer 7 adaptively controls Vmax and therefore the charging level of the storage capacitor 6: the voltage level at the storage capacitor 6 is measured and compared against a predefined target value at the end of each Boost-Buck cycle. The outcome of the comparison is used to control the initial energy level for the next active cycle (and packet size) in such a way that the residual energy is, for example, minimized.

The optimizer 7 results in a very efficient power management system because the consequences of the over sized Capacitor 6 and the changes due to temperature and aging are automatically compensated by the optimal charge voltage Vmax.

In its most simple implementation the Optimizer 7 can be enabled or disabled by a digital signal OPT at the Interface. However a different implementation of the Interface 4 (e.g. a serial interface) allows the system to support a number of different energy packets. For each packet the value of Vmax is controlled and optimized by the Optimizer 7 and can be selected using the Interface.

The invention claimed is:

1. A power converter and management system for providing energy to a pulsating load, comprising:
   an up-converter for converting a primary battery power source voltage to a higher voltage on a storage capacitor thereby storing energy in the storage capacitor for providing energy to a single pulse load of the pulsating load;
   a limiter for limiting a current drawn by the up-converter, from the primary power source voltage, to a maximum current setting;
   a down-converter for converting the storage capacitor voltage to a lower operating voltage, wherein the lower operating voltage is provided to the single pulse load of the pulsating load thereby consuming energy stored in the storage capacitor and thereby leaving a residual storage voltage at the storage capacitor; and
   an energy optimizer, comprising:
      (i) a voltage measurer configured to measure the residual storage voltage at the storage capacitor after energy in the storage capacitor has been consumed by the single pulse load of the pulsating load;
      (ii) a comparer configured to compare the measured residual storage voltage against a predetermined target voltage thereby defining a delta voltage; and
      (iii) a controller configured to control the up-converter such that the amount of energy to be stored in the storage capacitor is controlled such that the delta voltage is lowered for a subsequent pulse of said pulsating load.

2. The power converter and management system according to claim 1, wherein the controller is configured to control a time period in which the up-converter is active in converting the primary battery power source voltage to a higher voltage on the storage capacitor.

3. The power converter and management system according to claim 1, wherein the up-converter and the down-converter comprises a buck-boost converter.

* * * * *

UNITED STATES PATENT AND TRADEMARK OFFICE
CERTIFICATE OF CORRECTION

PATENT NO. : 10,126,764 B2
APPLICATION NO. : 15/550848
DATED : November 13, 2018
INVENTOR(S) : Petrus Kamp et al.

Page 1 of 1

It is certified that error appears in the above-identified patent and that said Letters Patent is hereby corrected as shown below:

On the Title Page

At (72) Inventors:
Change inventor Petrus Kamp's city "Sluiskeshoeven" to -- Rosmalen --.

Signed and Sealed this
Seventeenth Day of March, 2020

Andrei Iancu
*Director of the United States Patent and Trademark Office*